(12) United States Patent
Schneider et al.

(10) Patent No.: US 8,160,989 B1
(45) Date of Patent: Apr. 17, 2012

(54) METHOD AND APPARATUS FOR EFFICIENT TOKEN MATCHING USING COMPLEX RULES

(75) Inventors: Scott Schneider, Santa Monica, CA (US); Nathan Beckman, Altadena, CA (US)

(73) Assignee: Symantec Corporation, Mountain View, CA (US)

( * ) Notice: Subject to any disclaimer, the term of this patent is extended or adjusted under 35 U.S.C. 154(b) by 1005 days.

(21) Appl. No.: 11/864,948

(22) Filed: Sep. 29, 2007

(51) Int. Cl.
*G06F 17/00* (2006.01)
*G06N 5/02* (2006.01)

(52) U.S. Cl. .............................. 706/47; 705/40; 715/210

(58) Field of Classification Search .................. None
See application file for complete search history.

(56) References Cited

U.S. PATENT DOCUMENTS

| 6,195,658 B1 * | 2/2001 | Comito et al. ...................... 1/1 |
| 2002/0143521 A1 * | 10/2002 | Call ............................... 704/1 |
| 2005/0198070 A1 * | 9/2005 | Lowry ..................... 707/104.1 |

* cited by examiner

*Primary Examiner* — Omar Fernandez Rivas
*Assistant Examiner* — Kalpana Bharadwaj
(74) *Attorney, Agent, or Firm* — Wilmer Cutler Pickering Hale and Dorr LLP

(57) ABSTRACT

A method and apparatus for efficient token matching using complex rules. In one embodiment, the method and apparatus comprises searching a token stream to determine an earliest, narrowest token match range within a token stream.

17 Claims, 5 Drawing Sheets

METHOD AND APPARATUS FOR EFFICIENT TOKEN MATCHING USING COMPLEX RULES

BACKGROUND OF THE INVENTION

1. Field of the Invention

Embodiments of the present invention generally relate to search strategies and, more particularly, to a method and apparatus for efficient token matching using complex rules.

2. Description of the Related Art

In present day computer systems, data leakage is an ongoing and troublesome problem. Data leakage involves certain information that is "leaked" from a computer system. For example, data leakage may occur through the operation of malicious software, a user sending confidential information from a computer system, and the like. Presently, the text of transmission from computer systems is scanned to detect when information is being leaked. Every outbound e-mail may be scanned and blocked when specific strings of text messages are being sent. One type of leakage prevention system is rule-based, wherein specific keywords are identified as indicia of a leak and messages containing those keywords are blocked. From transmission, however, such keyword search algorithms can be cumbersome, slow and overly or insufficiently inclusive of the e-mails that are blocked.

Therefore, there is a need in the art for a method and apparatus to improve searching.

SUMMARY OF THE INVENTION

The present day invention generally comprises a method and apparatus for efficient token matching with complex rules. In one embodiment, the method and apparatus comprises a method of searching a token stream comprising determining an earliest, narrowest token match range within a token stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
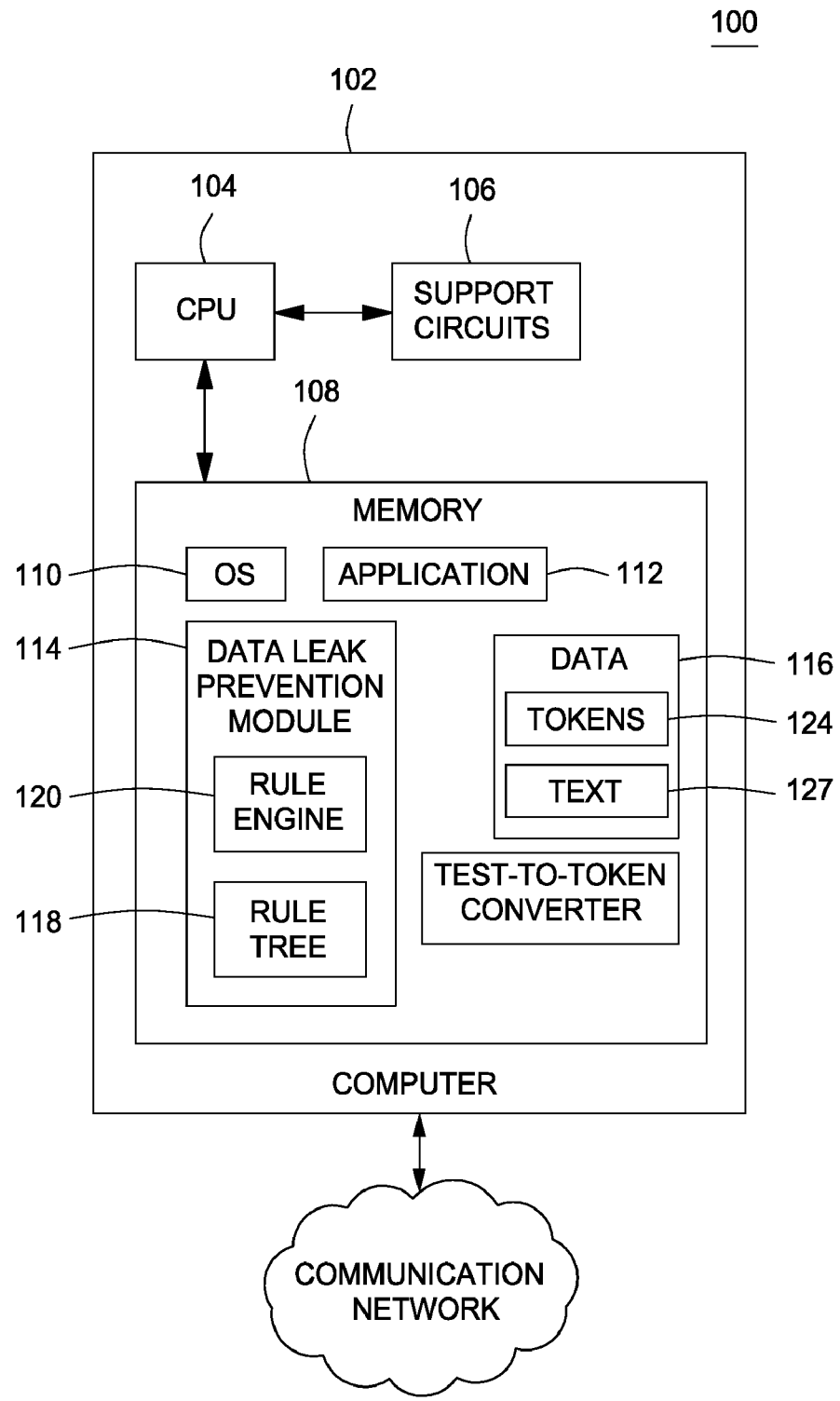
FIG. 1 is a block diagram illustrating a computer for performing token searching in accordance with the present invention.

FIG. 1 is a block diagram illustrating a computer system 100 for processing information to identify certain tokens within a token sequence in accordance with one embodiment with the present invention.

The system 100 comprises a computer 102 and a communications network 126. One use of embodiments of the invention is to limit data leakage from the computer 102 to the network 126. Other forms of leakage that may be impeded by embodiments of the invention include copying information to a portable storage device, printing, electronic mail, instant messaging and the like. In each instance, embodiments of the invention are employed to impede transmission of specific information, e.g., sensitive or confidential information, from the computer.

The computer 102 comprises a central processing unit (CPU) 104 support, support circuits 106, and memory 108. The CPU 104 may comprise a microprocessor, instruction set processor, a microcontroller, or similar processing element known in the art. The support circuits 106 may include power supplies, clock circuits, data registers, I/O circuitry and the like to facilitate and support operation of CPU 104. The memory 108 may include random access memory, read only memory, removable storage, hard disk storage, flash drives or any combination thereof. The support circuits 106 and the memory 108 are coupled to the CPU 104.

The memory 108 includes an operating system 110, various applications 112 (including an e-mail application that may be used to leak information to the network), a data leak prevention module 114 and a text-to-token converter 128. The data leak prevention module 114 comprises a rule tree 118 and a rule engine 120. The rule engine 120 may "enforce" a plurality of rule trees 118 with respect to the data 116. For simplicity, only one rule tree 118 is depicted. The data 116 comprises text 122 and at least one token 124. In operation, the text-to-token converter 126 (also known as a tokenizer) converts outbound text 122 into a sequence of tokens 124. The data leak prevention module 114 utilizes the rule tree 118 and the rule engine 120 to process the token sequence to identify when key information is contained in the transmission such that data leakage that may result in inadvertent transfer of information to the communication network 126 is blocked by the data leak prevention module 114.

Figure 2:
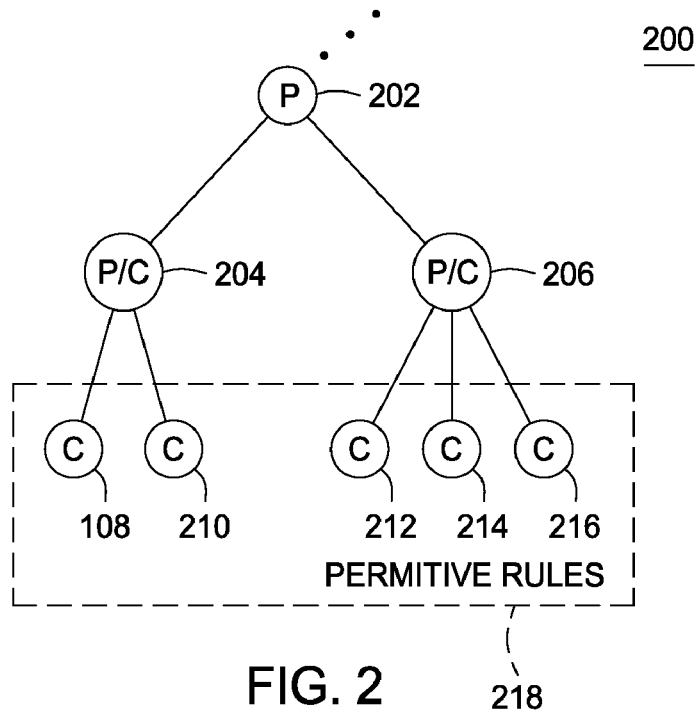
FIG. 2 is a illustration of a portion of a rule tree used for searching in accordance with the present invention.

FIG. 2 depicts a rule tree 200 (or portion thereof) which comprises a parent (P) node 202 and a plurality of parent-child (P/C) nodes 204 and 206, and a plurality of child (C) nodes 208, 210, 212, 214, and 216 This arrangement is a lisp-like tree of rules. The child nodes 208 through 216 form a set of primitive rules 218. In the embodiment shown, the child nodes 208 and 210 are coupled to the parent 204, and that parent 204 becomes a child for the node 202. The child nodes 212, 214, and 216 are coupled to the parent node 206, and the parent node 206 is coupled as a child to the parent node 202. This rule tree may be a portion of a much larger rule tree 200.

In a rule tree, the primitive rules are applied to the data set (token sequence) that is created by converting text to a sequence of tokens (referred to herein as a token stream). For example, the tokens are generated by analyzing the text generated by a specific application, such as an e-mail application, and dividing the text into keyword or key phrase groupings that become tokens. As such, the primitive rules of the child nodes are applied to the sequence of tokens. The grouping of the primitive rules by parent rules forms a complex rule tree. The complex rule tree is applied quickly to a stream of tokens to identify which tokens can be part of a rule match. To utilize the tree, a parent invokes a child by passing the child an integer that represents the earliest position in the token stream where the child's match can start. In this manner, the parent is able to be provided several different matches from a child.

The embodiments of the invention provide that when a node in the rule tree returns a match, the node return its earliest, narrowest possible matching range of keywords in the token stream. A matching range is a span of N tokens that comprise tokens that fulfill a given rule. Parent nodes within a rule tree are able to enforce this earliest, narrowest property on their own matches by re-querying the child nodes in specific ways, and by relying on their children to have the same earliest, narrowest property. This re-query process allows the rule engine, as shall be described below, to support the very useful "proximity" rule (PROX), and still run very quickly. A matching range is the "earliest" if no other matching range starts before that range. It is the "narrowest" range if no other matching range can be found entirely within the specific matching range.

The primitive rules identify specific character strings (tokens) such as "BUY" or "SELL", lists of keywords such as stock ticker symbols of a merger target, keywords that match a certain pattern (e.g., credit card numbers) and the like. The primitives are composed into complex rule trees using operations such as AND, OR, COUNT and PROX.

Figure 3:
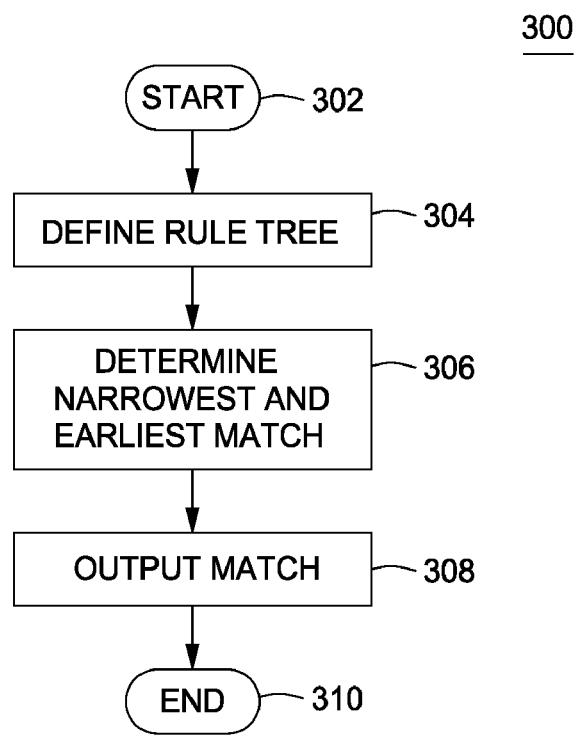
FIG. 3 depicts a flow diagram of a method for determining the narrowest and earliest match within a rule tree in accordance with one embodiment with the present invention.

FIG. 3 depicts a high-level flow diagram of a method 300 that represents one embodiment of the present invention. The method 300 begins at step 302 and proceeds to step 304, wherein the method 300 defines a rule tree for identifying specific information. At step 306, the rule tree is applied to a sequence of tokens to determine the narrowest and earliest match of tokens with the rule tree. At step 308, the match that is generated from step 306 is output. At step 310, the method 300 ends.

For example, the rule that checks for "BUY" and "stock symbol" is (AND "BUY"(OR "SYMC" "Symantec")) "stock symbol"). A more complicated rule from the problem statement uses the PROX rule, which checks the match found by its child rule and ensures that the range is not too long. Thus, a rule that will identify these three (Name, Phone Number, Credit Card) triples, where each triple is within a span no larger than 20 tokens, is (COUNT 3 PROX 20 (AND [Name] [Phone Number] [Credit Card]))). The technique re-queries the primitives that search for the tokens containing Name, Phone Number, and Credit Card until tree of these triples is found within a span of 20 tokens. This sequence of confidential information being leaked at such a rate may indicate malicious software or a disgruntled employee is transmitting the information.

Figure 4:
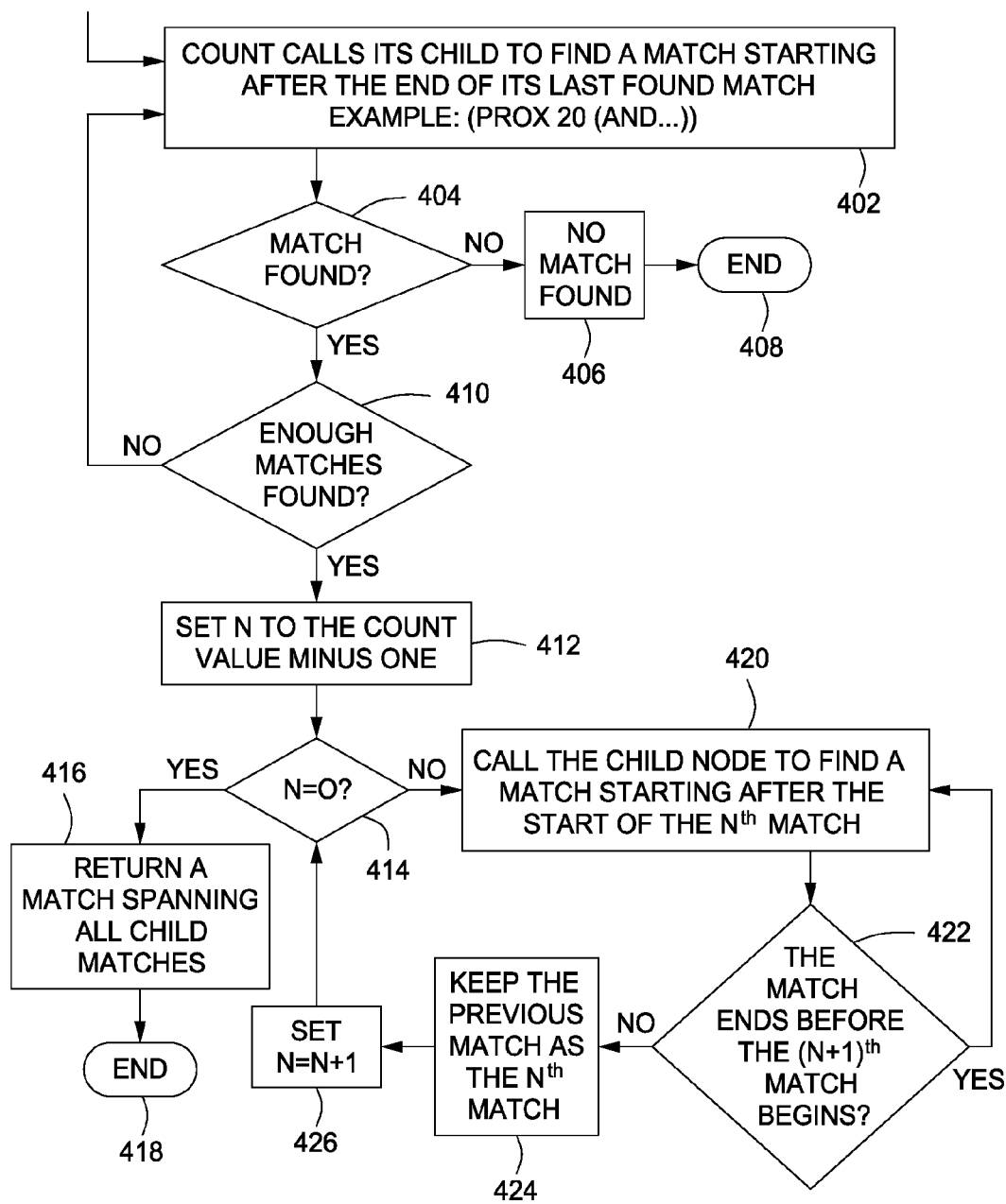
FIG. 4 depicts a flow diagram illustrating one exemplary embodiment of a method for processing a rule tree.
Figure 5:
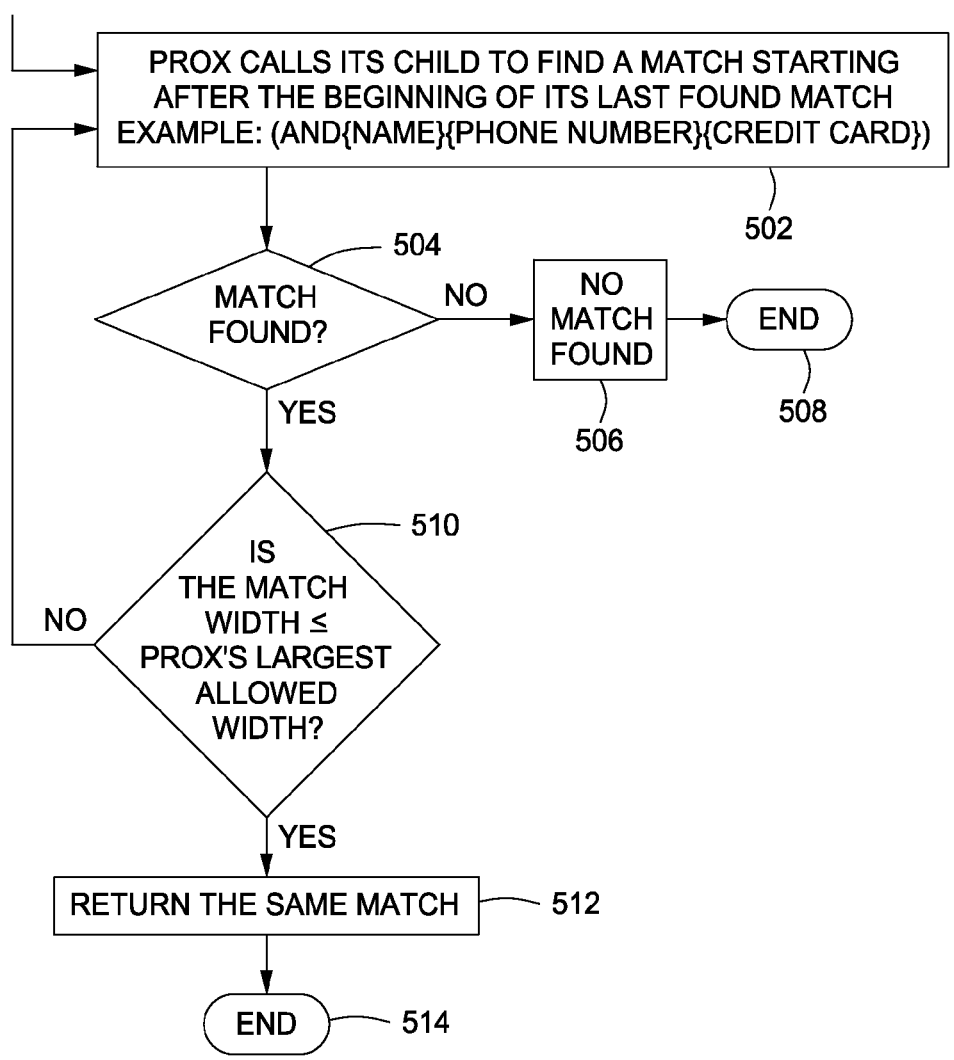
FIG. 5 depicts a flow diagram of a method of implementation for a PROX function, in accordance with an embodiment of the present disclosure.
Figure 6:
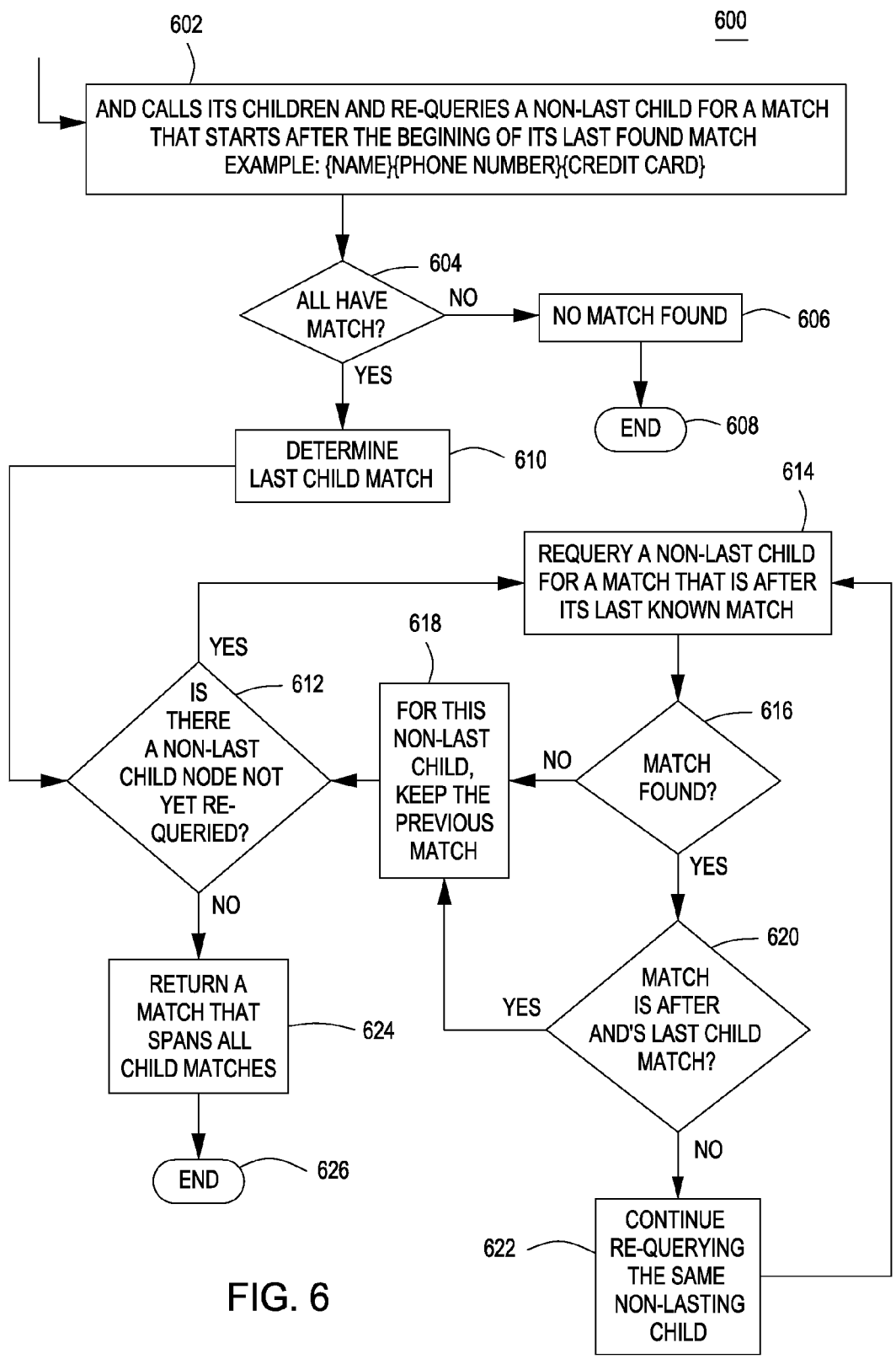
FIG. 6 depicts a flow diagram of a method of implementation for an AND function, in accordance with an embodiment of the present disclosure.

FIGS. 4, 5 and 6 respectively depict flow diagrams of a method of implementing each of the COUNT, PROX and AND functions using the example query above to illustrate the operation. In each instance, a parent node repeatedly calls a child node to determine the earliest, narrowest match range that fulfills the function.

FIG. 4 depicts a flow diagram of one embodiment of a method 400 of implementation for the COUNT function. The function finds N matches in the token sequence that fulfill the rules of its child node(s) by calling its child node to find a match starting after the end of its last found match. At step 402, the COUNT node calls its child node to find a match starting after the last found match. In the example, the child node is PROX 20 (AND . . . ). At step 404, the method 400 queries whether a match is found by the child. If the query is negatively answered, at step 406, the method 400 indicates that no match was found and ends at step 408.

If a match was found, the method 400 proceeds from step 404 to step 410. At step 410, the method 400 queries whether "enough" matches have been found to fulfill the count, e.g., three. If the query is negatively answered, the method 400 proceeds to step 402 to call the child node for another match; otherwise, the method 400 proceeds to step 412.

At step 412, the method 400 sets a variable N to the count value minus one, e.g., two, and proceeds to step 414. At step 414, the method 400 queries whether N equals zero. If the query is affirmatively answered, the method 400 proceeds to step 416 to return a match spanning all child matches, then ends at step 418. If the query at step 414 is negatively answered, the method 400 proceeds to step 420.

At step 420, the method 400 calls the child node to find a match starting after the start of the Nth match. At step 422, the method 400 queries whether the match ends before the (N+1) th match begins. If this query is affirmatively answered, the matches overlap and the method 400 returns to step 420 to call the child node for another match. If the query at step 422 is negatively answered, the method proceeds to step 424 to keep the previous match as the Nth match. At step 426, N is set to N minus one (N=N−1) and the method 400 returns to step 414.

FIG. 5 depicts a flow diagram of one embodiment of a method 500 of implementation for the PROX function. The function finds matches in the token sequence that fulfill the rules of its child node(s), where the matches are within N tokens of one another. The parent node of the PROX function calls its child not to find a match starting after the beginning of its last found match. In this example, N, the number of tokes in which a match must fit, is twenty.

The method 500 begins at step 502 wherein the parent node calls its child, e.g., (AND {Name}{PhoneNumber}{CreditCard}). At step 504, the method 500 queries whether a match is found. If no match, the method proceeds to step 506 to indicate that no match has been found and the method ends at step 508.

If a match is found, the method proceeds to query step 510, wherein the method 500 queries whether the width of the match is less than or equal to the largest allowed width by the PRX variable, e.g., 20. If the match is too wide, i.e., the matched tokens are not within the specified range limit, the method 500 returns to step 502 to call the child node for an additional match. If the match width is appropriate, the method proceeds from step 510 to step 512, wherein the method returns the match and the method 500 ends at step 514.

FIG. 6 depicts a flow diagram of one embodiment of a method 600 of implementation for the AND function. The function finds matches in the token sequence that fulfill all the rules of its child node(s) by calling its children nodes and re-querying a non-last child node for a match that starts after the beginning of its last found match.

The method 600 begins at step 602 wherein the parent node calls its children, e.g., {Name}{PhoneNumber}{CreditCard}. At step 604, the method 600 queries whether all the children have found a match. If no match, the method proceeds to step 606 to indicate that no match has been found and the method ends at step 608.

If all the children have a match, the method 600 proceeds to step 610 to determine the last child match. At step 612, the method 600 queries whether there is a last child node that has not been re-queried. If the query at step 612 is negatively answered, the method 600 proceeds to step 624 to return a match that spans all child matches, then the method 600 ends at step 626.

If the query at step 612 is affirmatively answered, the method 600 proceeds to step 614 to re-query the non-last child for a match that is after its last known match. At step 616, the method 600 queries whether such a match is found. If no match is found, the method proceeds to step 618 where, for each non-last child, the method 600 keeps the previous match. The method 600 then proceeds to step 612.

If a match was found, the method 600 queries, at step 620, whether the match is after AND's last child match. If the query is positively answered, the method 600 proceeds to step 618 to maintain the previous match. If the query is negatively answered, the method continue, at step 622, to re-query the same non-last child and proceeds to step 614.

Through re-querying the child nodes, the parent node enforces the rule tree and generates the earliest, narrowest match range from the token sequence.

Although the examples above describe the use of AND, COUNT and PROX, rules such as OR, ORDER, NOT-IN, as well as any other forms of rules and rule combinations may be used. In each rule, the rule is identifying the earliest, narrowest match range that fulfills the rule.

Note that the NOT-IN rule has two children—a positive and a negative rule—and an integer radius. It is satisfied when its positive child returns a match and there is no match of the negative rule that is entirely within the specified radius of the positive rule. This may be thought of as a not-in-proximity rule. A simple NOT rule is problematic in a framework in which each node returns the earliest, narrowest match, because the earliest, narrowest match that satisfies a NOT rule will always be a single token, which is probably not what rule authors would intend.

In an alternative embodiment, the invention is used to identify all keywords that could be part of a rule match. To do this the invention uses two levels of iteration. In each outer iteration the method chooses one primitive node, e.g., the NAME node. Then the method iterates over possible keywords for that primitive node that have not already been matched. The node is set only to return that keyword. Though slower than the main rule matching algorithm, this is still faster than the branch and bound approach of testing all combinations of keywords. The result is that the invention highlights only words that could be part of a rule match, e.g., given the rule (OR "Barney" (AND "Fred" "Flintstone")). If the text contains Barney and Fred but not Flintstone the embodiment of the invention highlights every instance of Barney but not Fred.

In another alternative embodiment, the invention operates upon each token individually and saves the state of the method after each token is presented. This allows the invention to process text as it is received (e.g. over a network connection), rather than all at once, in batch mode.

In the embodiment described above, the inventive search method and apparatus were used in a data leak prevention module. In other embodiments, embodiments of the invention may find use in keyword searching within documents or any other search technique that benefits from rapid rule tree searching.

While the foregoing is directed to embodiments of the present invention, other and further embodiments of the invention may be devised without departing from the basic scope thereof, and the scope thereof is determined by the claims that follow.

What is claimed is:

1. A method of searching a token stream comprising:
   identifying a portion of text data that is being forwarded to a network from a client device;
   converting the portion of text data into a token stream that comprises a sequence of a plurality of text tokens;
   applying the sequence of the plurality of text tokens to one or more rule trees; and
   determining an earliest, narrowest token match range within the sequence of the plurality of text tokens, wherein the earliest, narrowest match range comprises a span of N tokens that fulfills a given rule, and wherein no other match range starts before the earliest, narrowest match range and no other match range is found entirely within the earliest, narrowest match range.

2. The method of claim 1 wherein one of the one or more rule trees comprises at least one child node using a primitive token search.

3. The method of claim 2 wherein the one of the one or more rule trees further comprises at least one parent node coupled to the at least one child node to create complex rules.

4. The method of claim 1 further comprising;
   calling at least one child node to determine a token match;
   determining a last child token match;
   calling each child node that has not determined a non-last child node; and
   determining a narrowest range of tokens in the token stream comprising the token match related to the at least one child node.

5. The method of claim 2 where the determining step is performed upon the a sequence of the plurality of text tokens and the state of the one of the one or more rule trees is saved after each rule tree evaluation with respect to a text token.

6. The method of claim 2 wherein the one of the one or more rule trees comprises at least one of an AND rule, an OR rule, a PROX rule or a COUNT rule.

7. The method of claim 2 wherein a parent node in the one of the one or more rule trees enforces an earliest, narrowest property by relying upon a child node of the parent to enforce an earliest narrowest property with regard to matches produced by the child node.

8. The method of claim 2 wherein a COUNT function calls a child node to find a match starting after an end of a last found match of the child node.

9. The method of claim 1 wherein a PROX function calls a child node to find a match starting after a beginning of a last found match of the child node.

10. The method of claim 1 wherein an AND function calls a plurality of child nodes and re-queries a non-last child node for a match that starts after a beginning of a last found match of the non-last child node.

11. Apparatus for searching a token stream comprising:
    a text-to-token converter for identifying a portion of text data that is being forwarded to a network from a client device and converting the portion of text data into a token stream that comprises a sequence of a plurality of text tokens; and a rule engine for applying a rule tree to the sequence of the plurality of text tokens to determine the earliest, narrowest token match range that fulfills the rule tree, wherein the earliest, narrowest match range comprises a span of N tokens that fulfills a given rule, and wherein no other match range starts before the earliest, narrowest match range and no other match range is found entirely within the earliest, narrowest match range.

12. The apparatus of claim 11 where the rule engine processes the sequence of the plurality of text tokens and the state of the rule tree is saved after each rule tree evaluation with respect to a text token.

13. The apparatus of claim 11 wherein the rule tree comprises at least one of an AND rule, an OR rule, a PROX rule or a COUNT rule.

14. The apparatus of claim 11 wherein a parent node in the rule tree enforces an earliest, narrowest property by relying upon a child node of the parent to enforce an earliest narrowest property with regard to matches produced by the child node.

15. The apparatus of claim 11 wherein a COUNT function calls a child node to find a match starting after an end of a last found match of the child node.

16. The apparatus of claim 11 wherein a PROX function calls a child node to find a match starting after a beginning of a last found match of the child node.

17. The apparatus of claim 11 wherein an AND function calls a plurality of child nodes and re-queries a non-last child node for a match that starts after a beginning of a last found match of the non-last child node.

* * * * *